United States Patent
Desbois et al.

(10) Patent No.: US 11,958,267 B2
(45) Date of Patent: Apr. 16, 2024

(54) LAMINATE CONTAINING A METAL LAYER AND A LAYER OF A POLYAMIDE AND EVA

(71) Applicant: BASF SE, Ludwigshafen am Rhein (DE)

(72) Inventors: Philippe Desbois, Ludwigshafen (DE); Rui De Oliveira, Ludwigshafen (DE); Patrick Spies, Ludwigshafen (DE); Jasmina Simon, Ludwigshafen (DE); Julia Weimer, Braunschweig (DE)

(73) Assignee: BASF SE, Ludwigshafen am Rhein (DE)

( * ) Notice: Subject to any disclaimer, the term of this patent is extended or adjusted under 35 U.S.C. 154(b) by 314 days.

(21) Appl. No.: 17/274,214

(22) PCT Filed: Sep. 11, 2019

(86) PCT No.: PCT/EP2019/074260
§ 371 (c)(1),
(2) Date: Mar. 8, 2021

(87) PCT Pub. No.: WO2020/053296
PCT Pub. Date: Mar. 19, 2020

(65) Prior Publication Data
US 2021/0354427 A1 Nov. 18, 2021

(30) Foreign Application Priority Data
Sep. 14, 2018 (EP) .................................. 18194556

(51) Int. Cl.
*B32B 15/088* (2006.01)
*B32B 27/20* (2006.01)
*B32B 27/34* (2006.01)
*B32B 37/06* (2006.01)
*B32B 37/15* (2006.01)

(52) U.S. Cl.
CPC ............ *B32B 15/088* (2013.01); *B32B 27/20* (2013.01); *B32B 27/34* (2013.01); *B32B 37/06* (2013.01); *B32B 37/153* (2013.01); *B32B 2255/26* (2013.01); *B32B 2270/00* (2013.01); *B32B 2311/12* (2013.01); *B32B 2311/22* (2013.01); *B32B 2311/24* (2013.01); *B32B 2311/30* (2013.01); *B32B 2355/00* (2013.01); *B32B 2377/00* (2013.01)

(58) Field of Classification Search
None
See application file for complete search history.

(56) References Cited

U.S. PATENT DOCUMENTS

| | | | | |
|---|---|---|---|---|
| 3,626,026 A | * | 12/1971 | Fukumura | C09J 123/08 525/166 |
| 3,819,473 A | * | 6/1974 | Russell | C09J 177/00 138/146 |
| 3,997,625 A | * | 12/1976 | Ando | C09J 177/00 525/183 |
| 4,690,856 A | * | 9/1987 | Ito | C09J 7/22 428/458 |
| 11,351,716 B2 | | 6/2022 | Minkwitz et al. | |
| 2006/0269701 A1 | * | 11/2006 | Gauriat | C09J 177/02 428/416 |
| 2007/0232715 A1 | * | 10/2007 | Hoffmann | B29C 48/56 525/66 |
| 2011/0200816 A1 | * | 8/2011 | Mizrahi | B32B 15/02 428/458 |
| 2016/0172074 A1 | * | 6/2016 | Stoppelmann | C09D 177/06 428/458 |

FOREIGN PATENT DOCUMENTS

| | | | | |
|---|---|---|---|---|
| EP | 0469693 | * | 2/1992 | ............ C08L 23/04 |
| EP | 2085215 A1 | | 8/2009 | |
| GB | 2160819 B | | 7/1987 | |
| JP | 60222238 A | | 6/1985 | |
| JP | 11227119 A | | 8/1999 | |
| JP | H11/227119 A | * | 8/1999 | ............ B29C 47/02 |
| JP | 2013540833 A | | 11/2013 | |
| JP | 2020500737 A | | 1/2020 | |
| WO | 2005014278 A1 | | 2/2005 | |
| WO | 2012019115 A1 | | 2/2012 | |

OTHER PUBLICATIONS

Gerecke—EP 0469693 A2—MT—blend of polyamide and EVA—filler+rubber—1992 (Year: 1992).*
Polymer Database—Nylon 6-6—May 15, 2023 (Year: 2013).*
Polymer Database—Nylon 6—May 15, 2023 (Year: 2023).*
Polymer Database—Nylon 6-10—May 15, 2023 (Year: 2023).*
Polymer Database—Nylon 11—May 15, 2023 (Year: 2023).*
Polymer Database—Nylon 12—May 15, 2023 (Year: 2023).*
Wada—JP H11-227119 A—MT—EVA-polyamide comp. laminated w-metal—1999 (Year: 1999).*
International Search Report for corresponding PCT/EP2019/074260 dated Nov. 19, 2019, 2 Pages.

* cited by examiner

*Primary Examiner* — John Vincent Lawler
(74) *Attorney, Agent, or Firm* — Armstrong Teasdale LLP

(57) ABSTRACT

Described herein is a laminate including at least one first layer of at least one first metal and at least one further layer of a polymer composition (PC). Also described herein is a process for producing the laminate.

13 Claims, No Drawings

LAMINATE CONTAINING A METAL LAYER AND A LAYER OF A POLYAMIDE AND EVA

CROSS-REFERENCE TO RELATED APPLICATIONS

This application is a U.S. National Phase Application of International Patent Application No. PCT/EP2019/074260, filed Sep. 11, 2019, which claims the benefit of priority to European Patent Application No. 18194556.9, filed Sep. 14, 2018, the entire contents of which are hereby incorporated by reference herein.

The present invention relates to a laminate comprising at least one first layer of at least one first metal and at least one further layer of a polymer composition (PC). The present invention further relates to a process for producing the laminate of the invention.

A commonly encountered task in recent times is the provision of novel materials which are lighter than the materials used to date, especially for aircraft construction, automobile manufacture and boatbuilding. At the same time these novel materials shall have the same mechanical properties, in particular, strength, stiffness and stability, as the known materials or even improve upon these. The novel materials shall moreover be formable by known processes, for example by deep drawing, rolling, bending, stamping or seaming.

WO 2005/014278 describes laminates comprising an adherent polymer layer between two outer metal layers. This polymer layer comprises a nylon-6, nylon-6,6, nylon-11, nylon-12, nylon-4,6, nylon-6,10 or nylon-6,12 and a copolymer of ethylene and an unsaturated carboxylic acid and/or a carboxylic acid derivative and a reactive copolymer. The copolymer of ethylene and an unsaturated carboxylic acid and/or a carboxylic acid derivative is preferably a graft copolymer.

A particular disadvantage of the laminates described in WO 2005/014278 is that they have only poor tensile strength after storage in a humid environment. The polymer layer moreover often has varying adhesion properties.

US 2011/020816 describes laminates comprising two metal layers and an interposed polymer layer. The polymer layer comprises a nylon-6/66 copolymer, for example.

The laminates described in US 2011/020816 also exhibit only poor tensile strengths, particularly after storage in a humid environment, or are even destroyed to the point of being unusable by atmospheric humidity.

DE 10 2011 084 519 describes sealing layers for solar cells, comprising a first outer layer, a middle layer and a second outer layer. The layers may comprise polyamides, for example nylon-16 or nylon-6,6.

It is thus an object of the present invention to provide a laminate and a process for production thereof, which has the disadvantages of the laminates described in the prior art only to a reduced degree, if at all. In particular, the laminate is still to have high tensile strength even after prolonged storage at relatively high humidity.

This object is achieved by a laminate comprising at least one first layer of at least one first metal and at least one further layer of a polymer composition (PC), wherein the polymer composition (PC) comprises the following components:
  (A) at least one polyamide,
  (B) at least one copolymer obtainable by polymerizing at least the following components:
    (B1) at least one $C_2$-$C_{20}$-alkene and
    (B2) at least one $C_2$-$C_{18}$-alkenyl ester.

It has been found that, surprisingly, the laminates of the invention still have good tensile strengths both directly after production and after prolonged storage at relatively high humidity, for example after storage at 70° C. and 62% relative humidity for 14 days.

The present invention is more particularly elucidated hereinbelow.

Laminate

According to the invention, the laminate comprises at least one first layer of at least one first metal and at least one further layer of a polymer composition (PC).

What is meant in the context of the present invention by "at least one first layer" is either exactly one first layer or two or more first layers.

What is meant in the context of the present invention by "at least one first metal" is either exactly one first metal or a mixture of two or more first metals.

What is meant in the context of the present invention by "at least one further layer" is either exactly one further layer or two or more further layers.

The laminate preferably additionally comprises at least one second layer of at least one second metal, with the at least one first layer of at least one first metal joined to the at least one second layer of at least one second metal via the at least one further layer of the polymer composition (PC). In such a laminate, the at least one first layer is thus followed by at least one further layer which is in turn followed by at least one second layer.

Such a laminate which comprises at least one first layer, at least one further layer and at least one second layer is also known as a sandwich material.

The present invention therefore also provides a laminate where the laminate further comprises at least one second layer of at least one second metal and where the at least one first layer is joined to the at least one second layer via the at least one further layer.

The at least one first metal of the at least one first layer may be identical or different to the at least one second metal of the at least one second layer. The at least one first metal of the at least one first layer is preferably identical to the at least one second metal of the at least one second layer.

The laminate comprises at least one first layer of at least one first metal. In other words the laminate comprises at least one first layer made of at least one first metal.

The at least one first layer of at least one first metal has a thickness for example in the range from 0.1 to 0.6 mm, preferably in the range from 0.15 to 0.4 mm and especially preferably in the range from 0.18 to 0.3 mm.

The present invention therefore also provides a laminate where the at least one first layer has a thickness in the range from 0.1 to 0.6 mm.

The laminate preferably further comprises at least one second layer of at least one second metal. In other words the laminate preferably further comprises at least one second layer made of at least one second metal.

The at least one second layer of at least one second metal has a thickness for example in the range from 0.1 to 0.6 mm, preferably in the range from 0.15 to 0.4 mm and especially preferably in the range from 0.18 to 0.3 mm.

The present invention therefore also provides a laminate where the laminate further comprises at least one second layer of at least one second metal, wherein the at least one second layer has a thickness in the range from 0.1 to 0.6 mm.

The thickness of the at least one second layer may be identical or different to the thickness of the at least one first layer. The thickness of the at least one second layer is preferably identical to the thickness of the at least one first layer.

Suitable as the at least one first metal of the at least one first layer are any metals and metal alloys known to those skilled in the art which are solid at the production temperatures and the use temperatures of the laminate. The at least one first metal of the at least one first layer is preferably selected from the group consisting of iron, aluminum, copper, nickel and magnesium and also alloys thereof. The at least one first metal is more preferably an alloy of iron, and the at least one first metal is especially preferably steel.

The present invention therefore also provides a laminate where the at least one first metal of the at least one first layer is selected from the group consisting of iron, aluminum, copper, nickel and magnesium and also alloys thereof.

The present invention therefore also provides a laminate where the at least one first metal is selected from the group consisting of iron, aluminum, copper, nickel and magnesium and also alloys thereof.

Steel is known to those skilled in the art. In the context of the present invention "steel" is understood to mean alloys comprising iron as the primary constituent. This corresponds to the definition of steel according to DIN EN 10020:2000-07.

The at least one first metal may be coated or uncoated. The at least one first metal is preferably coated. Suitable coatings for the at least one first metal are known per se to those skilled in the art and are for example adhesion promoter layers, anticorrosion layers, paint, or zinc or magnesium coatings.

The at least one metal is preferably zinc-coated. "Zinc-coated" means that the at least one first metal is coated with a further metal, in particular with zinc or alloys of zinc.

It is therefore particularly preferable when the at least one first metal is zinc-coated steel.

The zinc-coating of the at least one first metal may be carried out by methods known to those skilled in the art, for example by hot-dip zinc coating or by galvanic zinc coating.

If the at least one first metal is zinc-coated it may further comprise further coatings, for example adhesion promoter layers and/or paint. This is known to those skilled in the art.

The coating of the at least one first metal may be carried out by any methods known to those skilled in the art, for example the coating may be effected from an aqueous solution or a dispersion.

The above-described elucidations and preferences for the at least one first metal of the at least one first layer apply correspondingly to the at least one second metal of the at least one second layer.

The present invention therefore also provides a laminate where the laminate further comprises at least one second layer of at least one second metal, wherein the at least one second metal of the at least one second layer is selected from the group consisting of iron, aluminum, copper, nickel and magnesium and also alloys thereof.

The laminate comprises at least one further layer of a polymer composition (PC). What this means, in other words, is that the at least one further layer consists of the polymer composition (PC).

The at least one further layer of a polymer composition (PC) has a thickness for example in the range from 0.02 to 1.5 mm, preferably in the range from 0.05 to 1 mm and especially preferably in the range from 0.1 to 0.5 mm.

The present invention therefore also provides a laminate where the at least one further layer has a thickness in the range from 0.02 to 1.5 mm.

The present invention therefore also provides a laminate where the at least one first layer has a thickness in the range from 0.1 mm to 0.6 mm and/or where the at least one further layer has a thickness in the range from 0.02 mm to 1.5 mm.

Polymer Composition (PC)

According to the invention, the polymer composition (PC) comprises the following components: (A) at least one polyamide and (B) at least one copolymer, obtainable by polymerizing at least one of the following components: (B1) at least one $C_2$-$C_{20}$-alkene and (B2) at least one $C_2$-$C_{18}$-alkenyl ester.

What is meant by "at least one polyamide" in the context of the present invention is either exactly one polyamide or a mixture (blend) of two or more polyamides.

What is meant by "at least one copolymer" in the context of the present invention is either exactly one copolymer or a mixture (blend) of two or more copolymers.

In the context of the present invention, the terms "component (A)" and "at least one polyamide" are used synonymously and therefore have the same meaning. Correspondingly, the terms "component (B)" and "at least one copolymer" are also used synonymously in the context of the present invention and have the same meaning.

In addition, the polymer composition (PC) may further comprise at least one further polymer.

What is meant by "at least one further polymer" in the context of the present invention is either exactly one further polymer or a mixture (blend) of two or more further polymers.

Polymers suitable as the at least one further polymer include any further polymers known to those skilled in the art. It will be apparent that the at least one further polymer is different than components (A) and (B).

It is preferable when the at least one further polymer is selected from the group consisting of polyethylene and copolymers of at least two monomers selected from the group consisting of ethylene, acrylic acid, maleic anhydride, isobutylene, propylene, octene, alkyl acrylate and alkyl methacrylate.

The present invention therefore also provides a laminate where the polymer composition (PC) further comprises at least one further polymer selected from the group consisting of polyethylene and copolymers of at least two monomers selected from the group consisting of ethylene, isobutylene, propylene, octene, alkyl acrylate, alkyl methacrylate, acrylic acid and maleic anhydride.

It will be apparent that the at least one further polymer is also different than components (C) described below, at least one rubber.

Alkyl acrylates are known to those skilled in the art and are also referred to as acrylic acid alkyl esters. Alkyl acrylates are formed by reaction of acrylic acid with an alkyl alcohol. Preference is given in accordance with the invention to n-butyl acrylate as alkyl acrylate.

Alkyl methacrylates are likewise known to those skilled in the art and are also referred to as methacrylic acid alkyl esters. Alkyl methacrylates are formed by reaction of methacrylic acid with an alkyl alcohol. Preference is given in accordance with the invention to methyl methacrylate as alkyl methacrylate.

In addition, the polymer composition (PC) may additionally comprise a component (C), at least one rubber. Any component (C) present will be elucidated in detail further down.

For example, the polymer composition (PC) comprises in the range from 1% to 30% by weight of component (C), preferably in the range from 2% to 20% by weight and especially preferably in the range from 5% to 15% by weight, based in each case on the sum total of the percentages by weight of components (A), (B) and (C), preferably based on the total weight of the polymer composition (PC).

The present invention therefore also provides a laminate where the polymer composition (PC) additionally comprises in the range from 1% to 30% by weight of a component (C), at least one rubber, based on the sum total of the percentages by weight of components (A), (B) and (C).

In addition, the polymer composition (PC) may additionally comprise at least one filler.

What is meant by "at least one filler" in the context of the present invention is either exactly one filler or else a mixture of two or more fillers.

Suitable fillers are all fillers known to the person skilled in the art that can be mixed with the components present in the polymer composition (PC), especially components (A) and (B).

It is preferable when the at least one filler is selected from the group consisting of inorganic fillers, organic fillers and natural fillers.

The at least one filler is typically particulate. For example, the at least one filler may be a fibrous material or take the form of spheres, for example. The at least one filler has, for example, an aspect ratio in the range from 1 to 15, preferably in the range from 1 to 10 and especially preferably in the range from 1 to 5. What is meant by the "aspect ratio" in the context of the present invention is the ratio of the greatest dimension of a particle of the at least one filler to the smallest dimension of a particle of the at least one filler.

In the context of the present invention, "fiber materials" is understood to mean all materials comprising fibers, for example individual fibers, fiber bundles (rovings), nonwoven fabrics, laid scrims, woven fabrics or knitted fabrics.

For example, the at least one filler is therefore selected from the group consisting of wollastonite, talc, boron fiber materials, glass fiber materials, carbon fiber materials, silica fiber materials, ceramic fiber materials, basalt fiber materials, metal fiber materials, aramid fiber materials, poly(p-phenylene-2,6-benzobisoxazole) fiber materials, polyester fiber materials, nylon fiber materials, polyethylene fiber materials, wood fiber materials, flax fiber materials, hemp fiber materials, coconut fiber materials and sisal fiber materials.

It is particularly preferable when the at least one filler is selected from the group consisting of glass fiber materials, carbon fiber materials, aramid fiber materials, poly(p-phenylene-2,6-benzobisoxazole) fiber materials, boron fiber materials, metal fiber materials, and potassium titanate fiber materials. It is especially preferable when the at least one filler is a glass fiber material.

The present invention therefore also provides a laminate where the polyamide composition additionally comprises at least one filler selected from the group consisting of inorganic fillers, organic fillers and natural fillers.

In a preferred embodiment, the polymer composition (PC) does not comprise any filler.

For example, the polymer composition (PC) comprises in the range from 40% to 97% by weight of component (A), preferably in the range from 60% to 96% by weight and especially preferably in the range from 70% to 93% by weight, based in each case on the sum total of the percentages by weight of components (A) and (B) and of any component (C), any at least one further polymer and any at least one filler, preferably based on the total weight of the polymer composition (PC).

The polymer composition (PC) comprises, for example, in the range from 2% to 30% by weight, preferably in the range from 2% to 20% by weight and especially preferably in the range from 2% to 15% by weight of component (B), based in each case on the sum total of the percentages by weight of components (A) and (B) and of any component (C), any at least one further polymer and any at least one filler, preferably based on the total weight of the polymer composition (PC).

The present invention therefore also provides a laminate where the polymer composition (PC) comprises in the range from 2% to 30% by weight of component (B), based on the sum total of the percentages by weight of components (A) and (B).

The polymer composition comprises, for example, in the range from 0% to 50% by weight, preferably in the range from 5% to 50% by weight and especially preferably in the range from 10% to 30% by weight of the at least one further polymer, based in each case on the sum total of the percentages by weight of components (A) and (B) and of the at least one further polymer, and of any component (C) and any at least one filler, preferably based on the total weight of the polymer composition (PC).

The polymer composition (PC) comprises, for example, in the range from 0.1% to 70% by weight of the at least one filler, preferably in the range from 0.5% to 60% by weight and especially preferably in the range from 1% to 50% by weight of the at least one filler, based in each case on the sum total of the percentages by weight of components (A) and (B) and of the at least one filler, and of any component (C) and any at least one further polymer, preferably based on the total weight of the polymer composition (PC).

The sum total of the percentages by weight of components (A) and (B), and of any component (C), in any at least one further polymer and any at least one filler typically add up to 100% by weight.

In addition, the polymer composition (PC) may comprise additives known to those skilled in the art. Additives which may be present in the polymer composition (PC) are selected, for example, from the group consisting of stabilizers, dyes, antistats, filler oils, surface improvers, siccatives, demolding aids, release agents, antioxidants, light stabilizers, PVC stabilizers, lubricants, flame retardants, blowing agents, impact modifiers, adhesion promoters, coupling agents and nucleating aids.

The present invention therefore also provides a laminate where the polymer composition (PC) further comprises at least one additive selected from the group consisting of stabilizers, dyes, antistats, filler oils, surface improvers, siccatives, demolding aids, release agents, antioxidants, light stabilizers, PVC stabilizers, lubricants, flame retardants, blowing agents, impact modifiers, adhesion promoters, coupling agents and nucleating aids.

These additives are known per se to the person skilled in the art. Coupling agents are also known as crosslinking agents. In the context of the present invention, "adhesion promoters" are understood to mean additives which further improve the adhesion of the polymer composition (PC) of the at least one further layer to the at least one first layer and optionally to the at least one second layer.

Component (A)

According to the invention, the polymer composition (PC) comprises component (A), at least one polyamide.

Suitable polyamides generally have a viscosity number of 70 to 350 mL/g, preferably of 70 to 240 mL/g. The viscosity number is determined in accordance with the invention from a 0.5% by weight solution of the polyamide in 96% by weight sulfuric acid at 25° C. to ISO 307.

Preferred polyamides are semicrystalline polyamides. Suitable polyamides have a weight-average molecular weight ($M_w$) in the range from 500 to 2 000 000 g/mol, preferably in the range from 5000 to 500 000 g/mol and more preferably in the range from 10 000 to 100 000 g/mol. The weight-average molecular weight ($M_w$) is determined according to ASTM D4001.

Suitable polyamides include for example polyamides which derive from lactams having 7 to 13 ring members. Suitable polyamides further include polyamides obtained by reaction of dicarboxylic acids with diamines.

Examples of polyamides which derive from lactams include those which derive from polycaprolactam, polycaprylolactam and/or polylaurolactam.

Suitable polyamides further include those obtainable from ω-aminoalkyl nitriles. A preferred ω-aminoalkyl nitrile is aminocapronitrile, which affords nylon-6. Dinitriles may moreover be reacted with diamine. Preference is given here to adiponitrile and hexamethylenediamine, the polymerization of which gives nylon-6,6. The polymerization of nitriles is effected in the presence of water and is also known as direct polymerization.

If polyamides obtainable from dicarboxylic acids and diamines are used, it is possible to use dicarboxylic acid alkanes (aliphatic dicarboxylic acids) having 6 to 36 carbon atoms, preferably 6 to 12 carbon atoms and more preferably 6 to 10 carbon atoms. Aromatic dicarboxylic acids are also suitable.

Examples of dicarboxylic acids include adipic acid, azelaic acid, sebacic acid, dodecanedioic acid and also terephthalic acid and/or isophthalic acid.

Suitable diamines include for example alkanediamines having 4 to 36 carbon atoms, preferably alkanediamines having 6 to 12 carbon atoms, in particular alkanediamines having 6 to 8 carbon atoms, and aromatic diamines, for example m-xylylenediamine, di(4-aminophenyl)methane, di(4-aminocyclohexyl)methane, 2,2-di(4-aminophenyl)propane and 2,2-di(4-aminocyclohexyl)propane and also 1,5-diamino-2-methylpentane.

Preferred polyamides are polyhexamethyleneadipamide, polyhexamethylenesebacamide and polycaprolactam and also copolyamide 6/66, especially having a proportion of caprolactam units of 5% to 95% by weight.

Also suitable are polyamides obtainable by copolymerization of two or more of the monomers mentioned hereinabove and hereinbelow or mixtures of a plurality of polyamides in any desired mixing ratio. Particularly preferred mixtures are mixtures of nylon-6,6 with other polyamides (P), in particular nylon-6/6,6.

Suitable polyamides are thus aliphatic, semiaromatic or aromatic polyamides. What is meant by the term "aliphatic polyamides" is that the polyamides are formed exclusively from aliphatic monomers. The term "semiaromatic polyamides" means that the polyamides are formed of both aliphatic and aromatic monomers. The term "aromatic polyamides" means that the polyamides are formed exclusively from aromatic monomers.

The nonexhaustive list which follows contains the aforementioned polyamides and further polyamides suitable for use in the laminate of the invention and also the monomers present.

AB Polymers:
PA 4 pyrrolidone
PA ε-caprolactam
PA 7 enantholactam
PA 8 caprylolactam
PA 9 9-aminopelargonic acid
PA 11 11-aminoundecanoic acid
PA 12 laurolactam AA/BB Polymers:
PA 46 tetramethylenediamine, adipic acid
PA 66 hexamethylenediamine, adipic acid
PA 69 hexamethylenediamine, azelaic acid
PA 610 hexamethylenediamine, sebacic acid
PA 612 hexamethylenediamine, decanedicarboxylic acid
PA 613 hexamethylenediamine, undecanedicarboxylic acid
PA 1212 dodecane-1,12-diamine, decanedicarboxylic acid
PA 1313 1,13-diaminotridecane, undecanedicarboxylic acid
PA 6T hexamethylenediamine, terephthalic acid
PA 9T nonyldiamine, terephthalic acid
PA MXD6 m-xylylenediamine, adipic acid
PA 6I hexamethylenediamine, isophthalic acid
PA 6-3-T trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 diaminodicyclohexylmethane, laurolactam
PA 6I/6T/PACM such as PA 6I/6T and diaminodicyclohexylmethane
PA 12/MACMI laurolactam, dimethyldiaminodicyclohexylmethane, isophthalic acid
PA 12/MACMT laurolactam, dimethyldiaminodicyclohexylmethane, terephthalic acid
PA PDA-T phenylenediamine, terephthalic acid Component (A) is preferably selected from the group consisting of nylon-6 (PA 6), nylon-6,6 (PA 6.6), nylon-6,10 (PA 6.10), nylon-6,12 (PA 6.12), nylon-12 (PA12), nylon-6,36 (PA 6.36), nylon-6/6,6 (PA 6/6.6), nylon-6/6I6T (PA 6/6I6T), nylon-6/6I (PA 6/6I), nylon-6/6,36 (PA 6/6.36) and nylon-6/6T (PA 6/6T).

Further preferably, component (A) is obtainable by polymerizing at least the following components:
(A1) caprolactam,
(A2) at least one $C_4$-$C_{40}$ diacid and
(A3) at least one $C_4$-$C_{20}$ diamine.

The present invention therefore also provides a laminate where component (A) is obtainable by polymerizing at least one of the following components:
(A1) caprolactam,
(A2) at least one $C_4$-$C_{40}$ diacid,
(A3) at least one $C_4$-$C_{20}$ diamine.

The present invention also provides a laminate where component (A) is obtainable by polymerizing at least the following components:
(A1) caprolactam,
(A2) at least one $C_4$-$C_{40}$ diacid,
(A3) at least one $C_4$-$C_{20}$ diamine.

In the context of the present invention, the terms "component (A1)" and "caprolactam" are used synonymously and therefore have the same meaning.

In the context of the present invention, the terms "component (A2)" and "at least one $C_4$-$C_{40}$ diacid" are likewise used synonymously and have the same meaning.

In the context of the present invention, the terms "component (A3)" and "at least one $C_4$-$C_{20}$ diamine" are likewise used synonymously and therefore have the same meaning.

If component (A) is obtainable by polymerizing components (A1), (A2) and (A3), component (A) is also referred to as copolyamide. The terms "copolyamide" and "component (A)" are then likewise used synonymously and have the same meaning.

The copolyamide can be prepared by polymerizing any desired amounts of components (A1), (A2) and (A3).

The copolyamide is preferably prepared by polymerizing 20% to 80% by weight of component (A1), more preferably in the range from 35% to 75% by weight and especially preferably in the range from 50% to 70% by weight, based in each case on the sum total of the percentages by weight of components (A1), (A2) and (A3).

The present invention therefore also provides a laminate where the copolyamide is obtainable by polymerizing 20% to 80% by weight of component (A1) based on the sum total of the percentages by weight of components (A1), (A2) and (A3).

In the polymerization, components (A2) and (A3) are preferably used such that they amount to 20% to 80% by weight, preferably 25% to 65% by weight and especially preferably 30% to 50% by weight, based on the sum total of the percentages by weight of components (A1), (A2) and (A3).

The present invention therefore also provides a laminate where the copolyamide is obtainable by polymerizing 20% to 80% by weight of components (A2) and (A3), based on the sum total of the percentages by weight of components (A1), (A2) and (A3).

It will be apparent that the percentages by weight of components (A1), (A2) and (A3) are based on the percentages by weight of components (A1), (A2) and (A3) prior to the polymerization, i.e. when components (A1), (A2) and (A3) have not yet reacted with one another. During the polymerization of components (A1), (A2) and (A3), the weight ratio of components (A1), (A2) and (A3) may change.

It is preferable when in the range from 45 to 55 mol % of component (A2) and in the range from 45 to 55 mol % of component (A3), based in each case on the sum of the molar percentages of the components (A2) and (A3), are polymerized.

It is particularly preferable when in the range from 47 to 53 mol % of component (A2) and in the range from 47 to 53 mol % of component (A3), based in each case on the sum of the molar percentages of the components (A2) and (A3), are polymerized.

It is most preferable when in the range from 49 to 51 mol % of component (A2) and in the range from 49 to 51 mol % of component (A3), based in each case on the sum of the molar percentages of the components (A2) and (A3), are polymerized.

It is thus most preferable when the components (A2) and (A3) are polymerized in a molar ratio to one another of 1:1.

It will be apparent that the molar percentages of components (A2) and (A3) are based on the molar percentages of components (A2) and (A3) before these have reacted with one another. During the polymerization of components (A1), (A2) and (A3), the molar weight ratio of components (A2) and (A3) to one another may change.

For preparation of the copolyamides, in addition to component (A), it is possible to polymerize a component (A1a), at least one additional lactam. It will be apparent that the at least one additional lactam is different than caprolactam.

In the context of the present invention the terms "component (A1a)" and "at least one additional lactam" are used synonymously and therefore have the same meaning.

What is meant by "at least one additional lactam" in the context of the present invention is either exactly one additional lactam or a mixture of two or more additional lactams.

Suitable additional lactams are known to those skilled in the art. Preference is given in accordance with the invention to lactams having 4 to 12 carbon atoms as the at least one additional lactam.

In the context of the present invention, "lactams" are understood to mean cyclic amides having preferably 4 to 12 carbon atoms, more preferably 5 to 8 carbon atoms, in the ring.

Suitable additional lactams are for example selected from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 7-aminoheptanolactam (heptano-7-lactam; ζ-lactam; ζ-heptanolactam), 8-aminooctanolactam (octano-8-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam) and 12-am inododecanolactam (dodecano-12-lactam; ω-dodecanolactam).

It is preferable when no component (A1a) is polymerized to produce the copolyamide.

According to the invention, the copolyamide is prepared by polymerizing components (A1), (A2) and (A3) and optionally (A1a). The polymerization of components (A1), (A2) and (A3) and optionally (A1a) is known to those skilled in the art. The polymerization of component (A1) and optionally (A1a) with components (A2) and (A3) is typically a condensation reaction. During the condensation reaction, components (A1) and optionally (A1a) react with components (A2) and (A3). This forms amide bonds between the individual components. Component (A1) is typically at least partly in open-chain form, i.e. in the form of ε-aminocaproic acid, during the polymerization.

The polymerization of the components (A1), (A2) and (A3) and optionally (A1a) may take place in the presence of a catalyst. Suitable catalysts include any catalysts known to those skilled in the art which catalyze the polymerization of components (A1), (A2) and (A3) and optionally (A1a). Such catalysts are known to those skilled in the art. Preferred catalysts are phosphorus compounds, for example sodium hypophosphite, phosphorous acid, triphenylphosphine or triphenyl phosphite.

The polymerization of components (A1), (A2) and (A3) and optionally (A1a) forms the copolyamide, which therefore comprises units derived from component (A1), units derived from component (A2) and units derived from component (A3) and optionally units derived from component (A1a).

The polymerization of the components (A1), (A2) and (A3) and optionally (A1a) forms the copolyamide as a copolymer. The copolymer may be a random copolymer but it may likewise be a block copolymer.

In a block copolymer, blocks of units derived from components (A2) and (A3) and blocks of units derived from component (A1) are formed. These alternate.

In a random copolymer, units derived from component (A1) appear in alternating sequence with units derived from components (A2) and (A3). This alternation is random. For example, two units derived from components (A2) and (A3) may be followed by one unit derived from component (A1) which in turn is followed by one unit derived from the components (A2) and (A3) which is then followed by three units derived from component (A1).

The preparation of the copolyamide preferably comprises the steps of:
i) polymerizing components (A1), (A2) and (A3) to obtain a first copolyamide,
ii) pelletizing the first copolyamide obtained in step i) to obtain a pelletized copolyamide,
iii) extracting the pelletized copolyamide obtained in step ii) with water to obtain an extracted copolyamide,
iv) drying the extracted copolyamide obtained in step iii) at a temperature ($T_T$) to obtain the copolyamide.

The polymerization in step i) may take place in any reactors known to those skilled in the art, preferably stirred tank reactors. It is additionally possible to add auxiliaries for improving reaction management that are known to those skilled in the art, for example defoamers such as polydimethylsiloxane (PDMS).

In step ii), the first copolyamide obtained in step i) may be pelletized by any methods known to those skilled in the art, for example by strand pelletization or underwater pelletization.

The extraction in step iii) may be effected by any methods known to those skilled in the art. During the extraction in step iii), by-products typically formed during the polymerization of the components (A1), (A2) and (A3) in step i) are extracted from the pelletized copolyamide.

In step iv), the extracted copolyamide obtained in step iii) is dried. Processes for drying are known to those skilled in the art. According to the invention, the extracted copolyamide is dried at a temperature ($T_T$). The temperature ($T_T$) is preferably above the glass transition temperature ($T_{G(A)}$) of the copolyamide and below the melting temperature ($T_{M(A)}$) of the copolyamide.

It is preferable when the temperature ($T_T$) is above 120° C. and below the melting temperature ($T_{M(A)}$) of the copolyamide.

The drying in step iv) is typically carried out over a period in the range from 1 to 100 hours, preferably in the range from 2 to 50 hours and especially preferably in the range from 3 to 40 hours.

It is thought that the drying in step iv) further increases the molecular weight of the copolyamide.

The copolyamide typically has a glass transition temperature ($T_{G(A)}$). The glass transition temperature ($T_{G(A)}$) is, for example, in the range from 10° C. to 90° C., preferably in the range from 20° C. to 70° C. and especially preferably in the range from 25° C. to 50° C., determined to ISO 11357-2:2014.

The present invention therefore also provides a laminate where the copolyamide has a glass transition temperature ($T_{G(A)}$), wherein the glass transition temperature ($T_{G(A)}$) is in the range from 10° C. to 90° C.

In the context of the present invention, the glass transition temperature ($T_{G(A)}$) of the copolyamide relates to the glass transition temperature ($T_{G(A)}$) of the dry copolyamide as per ISO 11357-2:2014.

What is meant by "dry" in the context of the present invention is that the copolyamide comprises less than 1% by weight, preferably less than 0.5% by weight and especially preferably less than 0.1% by weight of water, based on the total weight of the copolyamide. What is more preferably meant by "dry" is that the copolyamide comprises no water, and most preferably that the copolyamide comprises no solvent.

The copolyamide typically also has a melting temperature ($T_{M(A)}$). The melting temperature ($T_{M(A)}$) of the copolyamide is, for example, in the range from 180° C. to 215° C., preferably in the range from 170° C. to 210° C. and especially preferably in the range from 180° C. to 200° C., determined to ISO 11357-3:2014.

The present invention accordingly also provides a laminate, where the copolyamide has a melting temperature ($T_{M(A)}$) in the range from 180° C. to 215° C.

The copolyamide generally has a viscosity number ($VN_{(A)}$) in the range from 100 to 300 ml/g, determined in a 0.5 percent by weight solution of the copolyamide in a mixture of phenol/o-dichlorobenzene in a weight ratio of 1:1.

The viscosity number ($VN_{(A)}$) of the copolyamide is preferably in the range from 160 to 290 ml/g and more preferably in the range from 170 to 280 ml/g, determined in a 0.5 percent by weight solution of the copolyamide in a mixture of phenol/o-dichlorobenzene in a weight ratio of 1:1.

The copolyamide preferably has an amide function concentration in the range from 3.5 to 7 amide groups/1000 g/mol, more preferably in the range from 4 to 6.5 amide groups/1000 g/mol and especially preferably in the range from 4.5 to 6 amide groups/1000 g/mol.

The present invention therefore also provides a laminate where the copolyamide has an amide function concentration in the range from 3.5 to 7 amide groups/1000 g/mol.

The amide function concentration is determined arithmetically. This comprises taking an average over the molecular weight of the individual units of the copolyamide. 1000 divided by the averaged molecular weight then gives the amide function concentration.

The averaged molecular weight of the individual units of polyamide 6 (PA 6) for example is 113 g/mol. The amide function concentration is then 1000/113 g/mol=8.85 amide groups/1000 g/mol.

The averaged molecular weight of the individual units of polyamide 6.36 (PA 6.36) for example is 323 g/mol. The amide function concentration is then 1000/323 g/mol=3.10 amide groups/1000 g/mol.

The averaged molecular weight of the individual units of polyamide 6/6.36 (PA 6/6.36) comprising 40% by weight of 6.36 units for example is 0.6 * PA 6+0.4 * PA 6.36=0.6 * 113 g/mol+0.4 * 323 g/mol=197 g/mol. The amide function concentration is then 1000/197 g/mol=5.08 amide groups/1000 g/mol.

The averaged molecular weight of polyamide 66 (PA 66) for example is 113 g/mol. This then gives an amide function concentration of 1000/g/mol =8.85 amide groups/1000 g/mol for polyamide 6/66 independently of the proportion of PA 6 and PA 66 units.

After storage at 70° C. and 62% relative air humidity for 14 days, the copolyamide of the invention also has a water content preferably in the range from 1.0% to 2.7% by weight, more preferably in the range from 1.3% to 2.5% by weight and most preferably in the range from 1.5% to 2.3% by weight, based in each case on the total weight of the copolyamide after storage at 70° C. and 62% relative air humidity for 14 days.

Component (A1)

According to the invention, component (A1) is caprolactam. Caprolactam is known to those skilled in the art and is referred to as ε-caprolactam, ε-lactam, hexano-6-lactam or hexahydro-2H-azepin-2-one. Caprolactam is the cyclic amide of ε-aminocaproic acid and has CAS No. 105-60-2.

Component (A2)

According to the invention, component (A2) is at least one $C_4$-$C_{40}$ diacid.

What is meant by "at least one $C_4$-$C_{40}$ diacid" in the context of the present invention is either exactly one $C_4$-$C_{40}$ diacid or a mixture of two or more $C_4$-$C_{40}$ diacids.

In the context of the present invention, "$C_4$-$C_{40}$ diacids" is understood to mean aliphatic and/or aromatic compounds which are saturated or unsaturated and have 2 to 38 carbon atoms and two carboxyl groups (—COOH groups). The 2 to 38 carbon atoms may be in the main chain or in side chains. The $C_4$-$C_{40}$ diacids may thus be branched or unbranched or cycloaliphatic.

The at least one $C_4$-$C_{40}$ diacid is, for example, butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid, tetradecanedioic acid or hexadecanedioic acid.

Component (B) is preferably selected from the group consisting of hexanedioic acid, decanedioic acid and dodecanedioic acid.

Further preferably, component (A2) is at least one $C_{32}$-$C_{40}$ diacid.

It is thus preferable when the component is selected from the group consisting of hexanedioic acid, decanedioic acid, dodecanedioic acid and $C_{32}$-$C_{40}$ dioic acids.

A "$C_{32}$-$C_{40}$ diacid" is also referred to as a "$C_{32}$-$C_{40}$ dimer acid" or as a "$C_{32}$-$C_{40}$ dimer fatty acid". In the context of the present invention, the terms "$C_{32}$-$C_{40}$ diacid", "$C_{32}$-$C_{40}$ dimer acid" and "$C_{32}$-$C_{40}$ dimer fatty acid" are used synonymously and therefore have the same meaning.

$C_{32}$-$C_{40}$ Dimer acids are known per se to those skilled in the art and are typically prepared by dimerization of unsaturated fatty acids. This dimerization may be catalyzed by aluminas, for example.

Suitable unsaturated fatty acids for preparation of the at least one $C_{32}$-$C_{40}$ dimer acid are known to those skilled in the art and are, for example, unsaturated $C_{16}$ fatty acids, unsaturated $C_{18}$ fatty acids and unsaturated $C_{20}$ fatty acids.

Component (A2) is therefore preferably prepared proceeding from unsaturated fatty acids selected from the group consisting of unsaturated $C_{16}$ fatty acids, unsaturated $C_{18}$ fatty acids and unsaturated $C_{20}$ fatty acids, particular preference being given to the unsaturated $C_{18}$ fatty acids.

The present invention therefore also provides a laminate in which component (A2) is prepared proceeding from unsaturated fatty acids selected from the group consisting of unsaturated $C_{16}$ fatty acids, unsaturated $C_{18}$ fatty acids and unsaturated $C_{20}$ fatty acids.

A suitable unsaturated $C_{16}$-fatty acid is palmitoleic acid ((9Z)-hexadeca-9-enoic acid) for example.

Suitable unsaturated $C_{18}$-fatty acids are for example selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid), α-linolenic acid ((9Z,12Z,15Z)-octadeca-9,12,15-trienoic acid), γ-linolenic acid ((6Z,9Z,12Z)-octadeca-6,9,12-trienoic acid), calendulic acid ((8E,10E,12Z)-octadeca-8,10,12-trienoic acid), punicic acid ((9Z,11E,13Z)-octadeca-9,11,13-trienoic acid), α-eleostearic acid ((9Z,11E,13E)-octadeca-9,11,13-trienoic acid) and β-eleostearic acid ((9E,11E,13E)-octadeca-9,11,13-trienoic acid). Particular preference is given to unsaturated $C_{18}$-fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid).

Suitable unsaturated $C_{20}$-fatty acids are for example selected from the group consisting of gadoleic acid ((9Z)-eicosa-9-enoic acid), eicosenoic acid ((11Z)-eicosa-11-enoic acid), arachidonic acid ((5Z,8Z,11Z,14Z)-eicosa-5,8,11,14-tetraenoic acid) and timnodonic acid ((5Z,8Z,11Z,14Z,17Z)-eicosa-5,8,11,14,17-pentaenoic acid).

Component (A2) is especially preferably at least one $C_{36}$ dimer acid.

The at least one $C_{36}$-dimer acid is preferably produced from unsaturated $C_{18}$-fatty acids. It is particularly preferable when the the $C_{36}$-dimer acid is produced from $C_{18}$-fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid) and linoleic acid ((9Z,12Z)-octadeca-9,12-dienoic acid).

The preparation of component (A2) from unsaturated fatty acids can additionally form trimer acids; residues of unreacted unsaturated fatty acid may also remain.

The formation of trimer acids is known to those skilled in the art.

Preferably in accordance with the invention, component (A2) comprises at most 0.5% by weight of unreacted unsaturated fatty acid and at most 0.5% by weight of trimer acid, more preferably at most 0.2% by weight of unreacted unsaturated fatty acid and at most 0.2% by weight of trimer acid, based in each case on the total weight of component (A2).

Dimer acids (also known as dimerized fatty acids or dimer fatty acids) thus refer generally, and especially in the context of the present invention, to mixtures that are prepared by oligomerization of unsaturated fatty acids. They are preparable, for example, by catalytic dimerization of plant-derived unsaturated fatty acids, using unsaturated $C_{16}$- to $C_{20}$-fatty acids in particular as starting materials. The bond formation proceeds primarily by the Diels-Alder mechanism, and results, depending on the number and position of the double bonds in the fatty acids used to produce the dimer acids, in mixtures of primarily dimeric products having cycloaliphatic, linear aliphatic, branched aliphatic, and also $C_6$-aromatic hydrocarbon groups between the carboxyl groups. Depending on the mechanism and/or any subsequent hydrogenation, the aliphatic radicals may be saturated or unsaturated and the proportion of aromatic groups may also vary. The radicals between the carboxylic acid groups then comprise 32 to 40 carbon atoms for example. They are preferably prepared using fatty acids having 18 carbon atoms, so that the dimeric product thus has 36 carbon atoms. The radicals which join the carboxyl groups of the dimer fatty acids preferably comprise no unsaturated bonds and no aromatic hydrocarbon radicals.

In the context of the present invention, preference is thus given to using $C_{18}$ fatty acids in the preparation. It is particularly preferable to use linolenic acid, linoleic acid and/or oleic acid.

Depending on reaction management the above-described oligomerization affords mixtures which comprise primarily dimeric, but also trimeric, molecules and also monomeric molecules and other by-products. Purification by distillation is customary. Commercial dimer acids generally comprise at least 80% by weight of dimeric molecules, up to 19% by weight of trimeric molecules, and at most 1% by weight of monomeric molecules and of other by-products.

It is preferable to use dimer acids that consist to an extent of at least 90% by weight, preferably to an extent of at least 95% by weight, most preferably to an extent of at least 98% by weight, of dimeric fatty acid molecules.

The proportions of monomeric, dimeric, and trimeric molecules and of other by-products in the dimer acids may be determined by gas chromatography (GC), for example. The dimer acids are converted to the corresponding methyl esters by the boron trifluoride method (cf. DIN EN ISO 5509) before GC analysis and then analyzed by GC.

It is thus a fundamental characteristic of "$C_{32}$-$C_{40}$-dimer acids" in the context of the present invention that the production thereof comprises oligomerization of unsaturated fatty acids. This oligomerization forms dimeric products primarily, i.e. preferably to an extent of at least 80% by weight, more preferably to an extent of at least 90%, most preferably to an extent of at least 95% by weight and in particular to an extent of at least 98% by weight. The fact that the oligomerization thus forms predominantly dimeric products comprising exactly two fatty acid molecules justifies this designation, which is in any case commonplace. An alternative expression for the relevant term "dimer acids" is thus "mixture comprising dimerized fatty acids".

The dimer acids to be used are obtainable as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1012, Empol 1061, and Empol 1062 from BASF SE, and Unidyme 10 and Unidyme TI from Arizona Chemical. Component (A2) has, for example, an acid number in the range from 190 to 200 mg KOH/g.

Component (A3)

According to the invention, component (A3) is at least one $C_4$-$C_{20}$ diamine.

What is meant by "at least one $C_4$-$C_{20}$ diamine" in the context of the present invention is either exactly one $C_4$-$C_{20}$ diamine or a mixture of two or more $C_4$-$C_{20}$ diamines.

Component (A3) is preferably at least one $C_4$-$C_{12}$ diamine.

What is meant by "$C_4$-$C_{20}$ diamine" in the context of the present invention is aliphatic and/or aromatic compounds having 4 to 20 carbon atoms and two amino groups ($NH_2$ groups). The aliphatic and/or aromatic compounds may be unsubstituted or additionally at least monosubstituted. If the aliphatic and/or aromatic compounds are additionally at least monosubstituted, they may bear one, two or more substituents that are not involved in the polymerization of components (A1), (A2) and (A3). Such substituents are for example alkyl or cycloalkyl substituents. These are known per se to those skilled in the art. The at least one $C_4$-$C_{20}$ diamine is preferably unsubstituted. The same applies to $C_4$-$C_{12}$ diamine.

Suitable components (A3) are selected, for example, from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane, 1,8-diaminooctane, 1,9-diaminononane, 1,10-diaminodecane (decamethylenediamine), 1,11-diaminoundecane (undecamethylenediamine) and 1,12-diaminododecane (dodecamethylenediamine).

Component (A3) is preferably selected from the group consisting of tetramethylenediamine, pentamethylenediamine, hexamethylenediamine, decamethylenediamine and dodecamethylenediamine.

Component (B)

According to the invention, the polymer composition (PC) comprises at least one copolymer as component (B), obtainable by polymerizing at least the following components: (B1) at least one $C_2$-$C_{20}$-alkene and (B2) at least one $C_2$-$C_{18}$-alkenyl ester.

What is meant by "at least one $C_2$-$C_{20}$-alkene" in the context of the present invention is either exactly one $C_2$-$C_{20}$-alkene or a mixture of two or more $C_2$-$C_{20}$-alkenes.

What is meant by "at least one $C_2$-$C_{18}$-alkenyl ester" in the context of the present invention is either exactly one $C_2$-$C_{18}$-alkenyl ester or a mixture of two or more $C_2$-$C_{18}$-alkenyl esters.

In the context of the present invention, the terms "component (B1)" and "at least one $C_2$-$C_{20}$-alkene" are used synonymously and therefore have the same meaning. In the context of the present invention, the terms "component (B2)" and "at least one $C_2$-$C_{18}$-alkenyl ester" are likewise used synonymously and have the same meaning.

According to the invention, component (B1) is at least one $C_2$-$C_{20}$-alkene.

In the context of the present invention, a "$C_2$-$C_{20}$-alkene" is understood to mean unsubstituted or at least monosubstituted hydrocarbons having 2 to 20 carbon atoms, and at least one carbon-carbon double bond (C—C double bond). In other words, this means that the $C_2$-$C_{20}$-alkenes are unsaturated hydrocarbons having 2 to 20 carbon atoms. The hydrocarbons may be branched or unbranched.

Examples of $C_2$-$C_{20}$-alkenes having one C—C double bond are ethene, propene, 1-butene, 2-butene, 2-methylpropene (isobutylene), 1-pentene, 2-pentene, 2-methyl-1-butene, 3-methyl-1-butene, 1-hexene, 2-hexene, 3-hexene and 4-methyl-1-pentene. Examples of $C_2$-$C_{20}$-alkenes having 2 or more double bonds are allene, 1,3-butadiene, 1,4-pentadiene, 1,3-pentadiene, 2-methyl-1,3-butadiene (isoprene).

Component (B1) is preferably at least one $C_2$-$C_{10}$-alkene and especially preferably at least one $C_2$-$C_5$-alkene.

Component (B1) is further preferably selected from ethene, propene, 1-butene and 2-butene.

The present invention therefore also provides a laminate in which component (B1) is selected from the group consisting of ethene, propene, 1-butene and 2-butene.

According to the invention, component (B2) is at least one $C_2$-$C_{18}$-alkenyl ester.

In the context of the present invention, "$C_2$-$C_{18}$-alkenyl esters" are understood to mean esters of unsaturated $C_2$-$C_{18}$ alcohols with monocarboxylic acids.

Preferred monocarboxylic acids are $C_1$-$C_{18}$ monocarboxylic acids, more preferably $C_1$-$C_{15}$ monocarboxylic acids and especially preferably $C_1$-$C_9$ monocarboxylic acids.

"$C_1$-$C_{18}$ monocarboxylic acids" are understood to mean aliphatic and/or aromatic compounds, preferably aliphatic compounds, that are saturated or unsaturated, preferably saturated, and 1 to 18 carbon atoms with one carboxyl group (—COOH group). The 1 to 18 carbon atoms may be in the main chain or in side chains. The $C_1$-$C_{18}$ monocarboxylic acids may thus be branched or unbranched or cycloaliphatic. The same applies to $C_1$-$C_{15}$ monocarboxylic acids and $C_1$-$C_9$ monocarboxylic acids.

Unsaturated $C_2$-$C_{18}$ alcohols are understood to mean unsaturated hydrocarbons having 2 to 18 carbon atoms and one hydroxyl group (—OH group).

Preferably in accordance with the invention, component (B2) is selected from the group consisting of vinyl esters and propenyl esters; more preferably, component (B2) is at least one vinyl ester.

The present invention thus also provides a laminate in which component (B2) is at least one vinyl ester.

Component (B2) is preferably selected from the group consisting of vinyl acetate, vinyl propionate, vinyl butyrate, vinyl 2-ethylhexanoate, vinyl neopentanoate, vinyl hexanoate, vinyl neononanoate, vinyl neodecanoate, propenyl acetate, propenyl propionate, propenyl butyrate, propenyl 2-ethylhexanoate, propenyl neopentanoate, propenyl hexanoate, propenyl neononanoate and propenyl neodecanoate.

Component (B2) is more preferably selected from the group consisting of vinyl acetate, vinyl propionate, vinyl butyrate, vinyl 2-ethylhexanoate, vinyl neopentanoate, vinyl hexanoate, vinyl neononanoate and vinyl neodecanoate.

Most preferably, component (B2) is vinyl acetate.

The present invention therefore also provides a laminate in which component (B2) is selected from the group consisting of vinyl acetate, vinyl propionate and vinyl butyrate.

The polymerization of components (B1) and (B2) to obtain component (B) can be performed by any methods known to the person skilled in the art. Components (B1) and (B2) are typically free-radically interpolymerized. The molar ratio of components (B1) and (B2) during the polymerization is preferably in the range from 45:55 to 55:45.

It is possible, and preferable in accordance with the invention in one embodiment of the present invention, to hydrolyze the copolymer obtained on conclusion of polymerization of components (B1) and (B2). This at least partly hydrolyzes the monocarboxylic acid groups that originate from the $C_2$-$C_{18}$-alkenyl ester to obtain the alcohol.

This is known per se to those skilled in the art.

Component (B) is therefore preferably selected from the group consisting of polyethylene-vinyl acetate, polyethylene-vinyl alcohol and ethylene-vinyl acetate-vinyl alcohol copolymers.

Ethylene-vinyl acetate-vinyl alcohol copolymers are particularly preferred as component (B).

The present invention therefore also provides a laminate in which component (B) is selected from the group consisting of polyethylene-vinyl acetate, polyethylene-vinyl alcohol and ethylene-vinyl acetate-vinyl alcohol copolymers.

If component (B) is an ethylene-vinyl acetate-vinyl alcohol copolymer, the copolymer preferably comprises in the range from 1% to 50% by weight, more preferably in the range from 2% to 40% by weight and most preferably in the range from 5% to 30% by weight of vinyl acetate-derived units, based on the total weight of the ethylene-vinyl acetate-vinyl alcohol copolymer.

Component (B) of the invention preferably comprises units derived from ethylene, and units derived from vinyl acetate and/or units derived from vinyl alcohol.

Component (B) thus preferably comprises polyethylene units and units of the general formula VII and/or of the general formula VIII

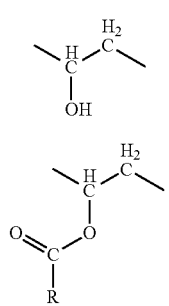

in which
R is selected from the group consisting of $C_1$-$C_7$alkyl, preferably selected from the group consisting of —$CH_3$, —$C_2H_5$, —$C_3H_7$, —$C_7H_{15}$, —$C_4H_9$ and —$C_2H_5$, especially preferably —$CH_3$.

More preferably, component (B) thus comprises polyethylene units and units of the general formula VII and of the general formula VIII.

The present invention therefore also provides laminate in which component (B) comprises polyethylene units and units of the general formula VII and/or of the general formula VIII

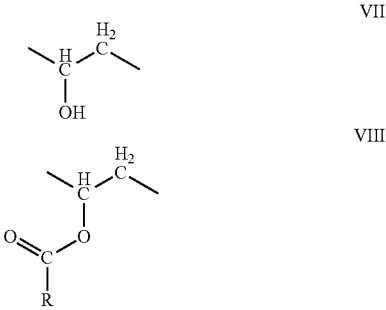

in which
R is selected from the group consisting of $C_1$-$C_7$alkyl, preferably selected from the group consisting of —$CH_3$, —$C_2H_5$, —$C_3H_7$, —$C_7H_{15}$, —$C_4H_9$ and -$C_2H_5$, especially preferably —$CH_3$.

Component (B) is preferably at least one linear copolymer. Further preferably, component (B) is not a graft polymer.

Component (C)

According to the invention, the polymer composition (PC) may comprise a component (C), at least one rubber.

In the context of the present invention, a "rubber" is also referred to as "impact-modified polymer" or as "rubber-elastic polymer" or as "elastomer". These terms are therefore used synonymously in the context of the present invention and therefore have the same meaning.

Component (C) is preferably at least one polymer based on olefins.

The present invention therefore also provides a laminate in which component (C) is at least one polymer based on olefins.

Further preferably, component (C) is not an olefin homopolymer. In other words, what this means is that component (C) is preferably at least one polymer based on two or more olefins. What is meant by "based on two or more olefins" in the context of the present invention is that the polymer is obtainable by polymerizing two or more olefins.

The present invention therefore also provides a laminate in which component (C) is at least one polymer based on two or more olefins.

Preferred rubbers are polymers based on olefins, obtainable by polymerizing the following components:
(C1) in the range from 40% to 100% by weight, preferably in the range from 55% to 79.5% by weight, of at least one α-olefin having 2 to 8 carbon atoms,
(C2) in the range from 0% to 90% by weight of at least one diene, (C3) in the range from 0% to 45% by weight, preferably in the range from 20% to 40% by weight, of at least one $C_1$-$C_{18}$-alkyl ester of acrylic acid or methacrylic acid, (C4) in the range from 0% to 40% by weight, preferably in the range from 0.5% to 20% by weight, of at least one ethylenically unsaturated monocarboxylic acid and/or an ethylenically unsaturated dicarboxylic acid or a derivative of at least one ethylenically unsaturated monocarboxylic acid and/or an ethylenically unsaturated dicarboxylic acid, (C5) in the range from 0% to 40% by weight of at least one monomer comprising epoxy groups, (C6) in the range from 0% to 5% by weight of other free-radically polymerizable monomers, with the proviso that component (C) is not an olefin homopolymer, where the percentages by weight are each based on the sum total of the percentages by weight of components (C1), (C2), (C3), (C4), (C5) and (C6).

The percentages by weight of components (C1), (C2), (C3), (C4), (C5) and (C6) are based on the percentages by weight of components (C1), (C2), (C3), (C4), (C5) and (C6) before they have reacted with one another. It will be apparent that the percentages by weight may possibly change during the interreaction of components (C1), (C2), (C3), (C4), (C5) and (C6).

It will be apparent that components (C1), (C2), (C3), (C4), (C5) and (C6) are each different than one another. More particularly, component (C3) is different than component (C4).

Rubbers obtainable by polymerizing components (C1), (C2), (C3), (C4), (C5) and (C6) are also referred to in the context of the present invention as olefin polymers.

Preferred rubbers are what are called ethylene-propylene rubbers (EPM rubbers) and ethylene-propylene-diene rubbers (EPDM rubbers), preferably each having a ratio of ethylene-derived units to propylene-derived units in the range from 40:60 to 90:10.

EPM rubbers generally have essentially no double bonds left in the polymer chain, whereas EPDM rubbers can have 1 to 20 double bonds/100 carbon atoms in the polymer chain.

EPDM rubbers are obtainable, for example, by polymerizing components (C1) and (C2).

Component (C1) is at least one α-olefin having 2 to 8 carbon atoms. In the context of the present invention, "at least one α-olefin having 2 to 8 carbon atoms" is also referred to as "$C_2$-$C_8$-alkene" or as "$C_2$-$C_8$-α-olefin".

In the context of the present invention, a $C_2$-$C_8$-α-olefin is understood to mean an unsubstituted or at least monosubstituted hydrocarbon having 2 to 8 carbon atoms and at least one carbon-carbon double bond (C—C double bond), with at least one carbon-carbon double bond in the α position, i.e. at the first position. What is meant in the context of the present invention by "at least one carbon-carbon double bond" is either exactly one carbon-carbon double bond or two or more carbon-carbon double bonds. Exactly one carbon-carbon double bond is preferred.

In other words, what is meant by $C_2$-$C_8$-α-olefin is that the hydrocarbons having 2 to 8 carbon atoms are unsaturated. The hydrocarbons may be branched or unbranched. Examples of $C_2$-$C_8$-α-olefin having exactly one C—C double bond are ethene, propene, 1-butene, 2-methylpropene (isobutylene), 1-pentene, 2-methyl-1-butene, 3-methyl-1-butene, 1-hexene and 4-methyl-1-pentene.

For example, component (C1) is selected from the group consisting of ethene, propene, 1-butene, 2-methylpropene (isobutylene), 1-pentene, 2-methyl-1-butene, 3-methyl-1-butene, 1-hexene and 4-methyl-1-pentene. Component (C1) is preferably selected from the group consisting of ethene, propene, 1-butene and 2-methylpropene (isobutylene), and component (C1) is most preferably selected from ethene and propene.

Component (C2) is selected, for example, from the group consisting of conjugated dienes, nonconjugated dienes having 5 to 25 carbon atoms, cyclic dienes, alkenylnorbornenes and tricyclodienes.

Suitable conjugated dienes are, for example, isoprene or butadiene. Suitable nonconjugated dienes having 5 to 25 carbon atoms are, for example, penta-1,4-diene, hexa-1,4-diene, hexa-1,5-diene, 2,5-dimethylhexa-1,5-diene and octa-1,4-diene. Suitable cyclic dienes are, for example, cyclopentadiene, cyclohexadienes, cyclooctadienes and dicyclopentadiene. Suitable alkenylnorbornenes are, for example, 5-ethylidene-2-norbornene, 5-butylidene-2-norbornene, 2-methallyl-5-norbornene and 2-isopropenyl-5-norbornene. Suitable tricyclodienes are, for example, 3-methyltricyclo(5.2.1.0$^{2.6}$)-3,8-decadiene.

Component (C2) is preferably selected from the group consisting of hexa-1,5-diene, 5-ethylidenenorbornene and dicyclopentadiene.

The diene content of the EPDM rubbers is preferably 0.5% to 50% by weight, especially 2% to 20% by weight and more preferably 3% to 15% by weight, based on the total weight of component (C). EPM/EPDM rubbers may preferably also be grafted with reactive carboxylic acids or derivatives thereof. Suitable reactive carboxylic acids are, for example, acrylic acid, methacrylic acid and derivatives thereof, and maleic anhydride.

Further preferred components (C) are, for example, MBS rubbers (methacrylate/butadiene/styrene rubbers) formed from:

65% to 99% by weight of a core obtainable by polymerizing (C2) in the range from 90% to 100% by weight of at least one diene and 0% to 10% by weight of further crosslinkable monomers, and 1% to 35% by weight of a shell obtainable by polymerizing (C7) in the range from 1% to 30% by weight of styrene or substituted styrenes or mixtures thereof and (C8) in the range from 70% to 100% by weight of at least one unsaturated nitrile.

Suitable monomers (C7) are styrenes or substituted styrenes of the general formula I and mixtures of these

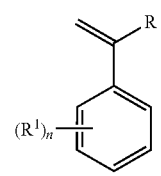

in which R is a $C_1$- to $C_8$-alkyl radical, preferably methyl or ethyl, or hydrogen, and $R^1$ is a $C_1$- to $C_8$-alkyl radical, preferably methyl or ethyl, and n has the value of 1, 2 or 3.

A further group of preferred olefin polymers is that of copolymers of α-olefins having 2 to 8 carbon atoms, especially of ethylene, with at least one $C_1$-$C_{18}$-alkyl ester of acrylic acid or methacrylic acid (component (C3)).

In principle, any of the primary, secondary and tertiary $C_1$-$C_{18}$-alkyl esters of acrylic acid or methacrylic acid are suitable. Preference is given to $C_1$-$C_{12}$-alkyl esters, particular preference to $C_2$-$C_{10}$-alkyl esters.

Examples of these are methyl acrylate, ethyl acrylate, propyl acrylate, n-butyl acrylate, i-butyl acrylate, t-butyl acrylate, 2-ethylhexyl acrylate, octyl acrylates, decyl acrylates, methyl methacrylate, ethyl methacrylate, propyl methacrylate, n-butyl methacrylate, butyl methacrylate, t-butyl methacrylate, 2-ethylhexyl methacrylate, octyl methacrylates, decyl methacrylates. Preference is given to methyl acrylate, ethyl acrylate, propyl acrylate, n-butyl acrylate, i-butyl acrylate, t-butyl acrylate, 2-ethylhexyl acrylate, octyl acrylates and decyl acrylates. n-Butyl acrylate and 2-ethylhexyl acrylate are especially preferred.

The proportion of the methacrylic esters and acrylic esters (C3) in the olefin polymers is, for example, in the range from 0% to 60% by weight, preferably in the range from 10% to 50% by weight and especially preferably in the range from 30% to 45% by weight, based in each case on the sum total of the percentages by weight of components (C1) to (C6).

Examples of component (C4) include dicarboxylic acids such as maleic acid and fumaric acid or derivatives of these acids and their monoesters.

Component (C4) is preferably a latently acid-functional monomer.

Latently acid-functional monomers shall be understood to mean those compounds that form free acid groups on polymerization and/or on incorporation of component (C) into the polymer composition (PC). Examples of these include anhydrides of dicarboxylic acids having up to 20 carbon atoms, especially maleic anhydride.

For example, component (C4) is selected from the group consisting of compounds of the general formulae II and III:

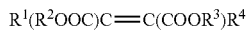

II

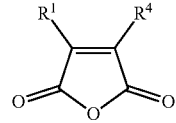

III in which
$R^1$, $R^2$, $R^3$, $R^4$ are independently hydrogen or alkyl groups having 1 to 6 carbon atoms.

Component (C4) is therefore preferably selected from the group consisting of maleic acid, fumaric acid and maleic anhydride.

For example, component (C5) is selected from the group consisting of compounds of the general formulae IV and V:

IV

V

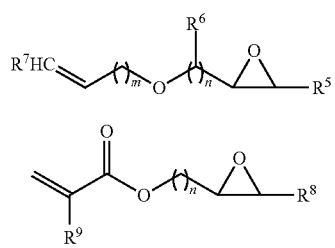

in which
$R^5$, $R^6$, $R^7$, $R^8$, $R^9$ are independently hydrogen or alkyl groups having 1 to 6 carbon atoms;
m is an integer from 0 to 20 and
n is an integer from 0 to 10.

Preferably, $R^1$, $R^2$, $R^3$, $R^4$, $R^5$, $R^6$, $R^7$, $R^8$, $R^9$ are independently hydrogen, m is 0 or 1, and n is 1.

Preferred compounds of the formulae IV and V are epoxy group-comprising esters of acrylic acid and/or methacrylic acid, particular preference being given to glycidyl acrylate and glycidyl methacrylate.

Component (C5) is preferably selected from the group consisting of alkenyl glycidyl ethers and vinyl glycidyl ether.

The proportions of components (C4) and (C5) are preferably each 0.07% to 40% by weight, especially 0.1% to 20% by weight and more preferably 0.15% to 15% by weight, based on the total weight of components (C1) to (C6).

Particularly preferred components (C) are olefin polymers obtainable by polymerizing
50% to 98.9% by weight, especially 55% to 65% by weight, of ethylene,
0.1% to 20% by weight, especially 0.15% to 10% by weight, of glycidyl acrylate and/or glycidyl methacrylate, acrylic acid and/or maleic anhydride,
1% to 45% by weight, especially 25% to 40% by weight, of n-butyl acrylate and/or 2-ethylhexyl acrylate, and
0% to 10% by weight, especially 0.1% to 3% by weight, of maleic anhydride or fumaric acid or mixtures thereof,
where the percentages by weight are each based on the sum total of the percentages by weight of the components used for polymerization.

Examples of useful components (C6) include vinyl esters and vinyl ethers.

The above-described olefin polymers can be prepared by processes known per se, preferably by random copolymerization under high pressure and at elevated temperature.

The melt flow index of the olefin polymers is generally in the range from 1 to 80 g/10 min (measured at 190° C. under a load of 2.16 kg).

Further preferred components (C) are acrylate rubbers formed from:
a) 70% to 90% by weight and preferably 75% to 85% by weight of a crosslinked elastomeric core composed of:
  1) 20% to 90% by weight of a core consisting of a copolymer obtainable by polymerizing
    an n-alkyl acrylate wherein the alkyl group has 5 to 12 carbon atoms, preferably 5 to 8 carbon atoms, or a mixture of alkyl acrylates wherein the alkyl groups have 2 to 12 carbon atoms, preferably 4 to 8 carbon atoms;
    a polyfunctional crosslinking agent having at least one C-C double bond, where at least one of the C-C double bonds is a vinyl group ($CH_2$=C-group), and
    optionally a polyfunctional grafting agent having at least one C—C double bond, where at least one of the C-C double bond is an allyl group ($CH_2$=CH—$CH_2$—group),
    wherein the core comprises a molar amount of the polyfunctional crosslinking agent and optionally of the polyfunctional grafting agent of 0.05 to 5 mol % and preferably in an amount of 0.5 to 1.5 mol %, based on the total amount of the core;
  2) 80% to 10% by weight of a shell consisting of a copolymer obtainable by polymerizing
    an n-alkyl acrylate wherein the alkyl group has 4 to 12 carbon atoms, preferably 4 to 8 carbon atoms, or a mixture of alkyl acrylates wherein the alkyl groups have 2 to 12 carbon atoms, preferably 4 to 8 carbon atoms; and a polyfunctional grafting agent having at least one C—C double bond, where at least one of the C—C double bonds is an allyl group (CH$_2$=CH—CH$_2$— group),
    wherein the shell comprises the grafting agent in a molar amount of 0.05 to 2.5 mol % and preferably in an amount of 0.5 to 1.5 mol %, based in each case on the total amount of the shell, and
b) 30% to 10% by weight, preferably 25% to 15% by weight, of a shell that has been grafted onto the core and consists of an alkyl methacrylate polymer wherein the alkyl group has 1 to 4 carbon atoms, or of a random copolymer of an alkyl methacrylate wherein the alkyl group has 1 to 4 carbon atoms and an alkyl acrylate wherein the alkyl group has 1 to 8 carbon atoms, where the alkyl acrylate is present in a molar amount of 5 to 40 mol % and preferably in the range from 10 to 20 mol %, based on the total amount of the random copolymer.

The n-alkyl acrylates usable to form the copolymers 1) and/or 2) may be the same or different.

Suitable n-alkyl acrylates for formation of copolymer 1) are, for example, n-pentyl acrylate, n-hexyl acrylate, n-heptyl acrylate and n-octyl acrylate. n-Octyl acrylate is preferred.

Examples of n-alkyl acrylates usable according to the invention to form the copolymer 2) are, for instance, n-butyl acrylate, n-pentyl acrylate, n-hexyl acrylate, n-heptyl acrylate and n-octyl acrylate. n-Octyl acrylate is preferred.

According to the present invention, preference is given to using n-alkyl acrylates and especially n-octyl acrylate for preparation of copolymers 1) and 2).

Suitable mixtures of alkyl acrylates comprise, for example, at least two compounds selected from the group consisting of ethyl acrylate, n-propyl acrylate, n-butyl acrylate, amyl acrylate, 2-methylbutyl acrylate, 2-ethylhexyl acrylate, n-hexyl acrylate, n-octyl acrylate, n-decyl acrylate, n-dodecyl acrylate and 3,5,5-trimethylhexyl acrylate.

When the copolymers 1) and/or 2) are formed using a mixture of alkyl acrylates, n-alkyl acrylate is used, for example, in a proportion by weight of at least 10% by weight of the mixture of alkyl acrylates, this amount preferably being in the range from 20% to 80% by weight.

If the copolymers 1) and/or 2) are formed using a mixture of alkyl acrylates, preferably 20% to 80% by weight of n-octyl acrylate and preferably 80% to 20% by weight of n-butyl acrylate are used.

Examples of alkyl methacrylates that may be used to form the shell according to the present invention that has been grafted onto the crosslinked elastomeric core are, for example, ethyl methacrylate, n-propyl methacrylate, isopropyl methacrylate, n-butyl methacrylate, isobutyl acrylate and methyl methacrylate. Methyl methacrylate is especially preferred.

The crosslinking agent used to form the copolymer 1) may, according to the present invention, especially be selected from the derivatives having at least two double bonds of the vinyl type or one or more double bonds of the vinyl type and at least one double bond of the allyl type. Preference is given to using compounds comprising mainly double bonds of the vinyl type in their molecules.

Crosslinking agents used may, for example, be divinylbenzenes, (meth)acrylates of polyalcohols, for example trimethylolpropane triacrylate, trimethylolpropane trimethacrylate, allyl acrylate, allyl methacrylate, diacrylates or methacrylates of alkylene glycols having 2 to 10 carbon atoms in the alkylene chain, and especially ethylene glycol diacrylate, ethylene glycol dimethacrylate, butane-1,4-diol diacrylate, butane-1,4 dimethacrylate, hexene-1,6-diol diacrylate, hexane-1,6 dimethacrylate, the diacrylate or dimethacrylate of polyoxyalkylene glycol of the general formula VI:

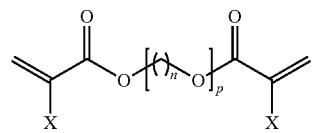

in which X is hydrogen or methyl, n is an integer from 2 to 4 and p is an integer from 2 to 20. Particular preference is given to the diacrylate or dimethacrylate of polyoxyethylene glycol, in which the polyoxyethylene group has a molar mass of about 400 (n=2 and p=9 in the general formula VI).

The grafting agent used to prepare the copolymer 2) may, according to the present invention, especially be selected from the derivatives having at least two double bonds of the allyl type or one or more double bonds of the allyl type and at least one double bond of the vinyl type.

Preference is given to using compounds comprising mainly double bonds of the allyl type in their molecules.

Examples of useful grafting agents of this kind include, for example, diallyl maleate, diallyl itaconate, allyl acrylate, allyl methacrylate, triallyl cyanurate, triallyl isocyanurate, diallyl terephthalate and triallyl trimesate.

Component (C) typically has a glass transition temperature ($T_G$(C)) below 0° C. For example, the glass transition temperature ($T_G$(C)) of component (C) is in the range from −150 to 0° C. and preferably in the range from −60 to −30° C., determined to ISO 11357-2:2014.

The present invention therefore also provides a laminate in which component (C) has a glass transition temperature ($T_G$(C)) below 0° C.

In the context of the present invention, the glass transition temperature ($T_G$(C)) of component (C) relates, in accordance with ISO 11357-2:2014, to the glass transition temperature ($T_G$(C)) of the dry component (C).

What is meant by "dry" in the context of the present invention is that component (C) comprises less than 1% by weight, preferably less than 0.5% by weight and especially preferably less than 0.1% by weight of water, based on the total weight of component (C). What is more preferably meant by "dry" is that component (C) comprises no water, and most preferably that component (C) comprises no solvent.

Production

The laminate of the invention may be produced by any methods known to those skilled in the art.

It is preferable when the laminate is produced in a continuous process.

The laminate of the invention is preferably produced in a process comprising the steps of:
a) providing a film of a polymer composition (PC) comprising the following components:
   (A) at least one polyamide,
   (B) at least one copolymer prepared by polymerizing at least the following components:
      (B1) at least one $C_2$-$C_{20}$-alkene and
      (B2) at least one $C_2$-$C_{18}$-alkenyl ester,
b) heating a first sheet of at least one first metal,
c) pressing the heated first sheet from step b) with the film provided in step a) to obtain the laminate.

The present invention therefore also provides a process for producing a laminate of the invention, comprising the steps of
a) providing a film of a polymer composition (PC) comprising the following components:
(A) at least one polyamide,
(B) at least one copolymer prepared by polymerizing at least the following components:
(B1) at least one $C_2$-$C_{20}$-alkene and
(B2) at least one $C_1$-$C_{18}$-alkenyl ester,
b) heating a first sheet of at least one first metal,
c) pressing the heated first sheet from step b) with the film provided in step a) to obtain the laminate.

The above-described elucidations and preferences for the polymer composition (PC) of the laminate apply correspondingly to the polymer composition (PC) in the process of the invention. The above-described elucidations and preferences for the at least one polyamide of the laminate apply correspondingly to the at least one polyamide in the process of the invention.

The above-described elucidations and preferences for the at least one copolymer in the laminate of the invention likewise apply correspondingly to the at least one copolymer in the process of the invention. The above-described elucidations and preferences for the at least one first metal of the laminate likewise apply correspondingly to the at least one first metal in the process of the invention.

Step a) comprises providing a film of the polymer composition (PC). The film provided in step a) consists of the polymer composition (PC).

Processes for providing a film of a polymer composition (PC) are known per se to those skilled in the art. Step a) preferably comprises providing the film by an extrusion method.

The present invention therefore also provides a process in which the film is provided in step a) by an extrusion method.

Suitable extrusion methods for providing the film of the polymer composition (PC) are known to those skilled in the art and include, for example, casting methods, calendering methods, blowing methods or multi-blowing methods.

The film of the polymer composition (PC) provided in step a) may have any desired thicknesses. The film of the polymer composition (PC) provided in step a) typically has a thickness in the range from 1% to 20% greater than the at least one further layer of the laminate to be produced, preferably in the range from 2% to 15% greater than the at least one further layer of the laminate to be produced and especially preferably in the range from 4% to 10% greater than the at least one further layer of the laminate to be produced.

Step b) comprises heating a first sheet of at least one first metal. The first sheet is made of the at least one first metal. The first sheet can be heated by any methods known to the person skilled in the art; preference is given to inductive heating of the first sheet in step b).

The present invention therefore also provides a process in which the first sheet is heated in step b) by inductive means.

Step b) may comprise heating the first sheet to any desired temperature. Step b) preferably comprises heating the first sheet to a temperature above the melting temperature ($T_{(PC)}$) and below the decomposition temperature of the polymer composition (PC).

Step b) preferably comprises heating the first sheet to a temperature in the range from 150° C. to 350° C., more preferably in the range from 210° C. to 280° C. and especially preferably in the range from 220° C. to 250° C.

The present invention therefore also provides a process in which step b) comprises heating the first sheet to a temperature in the range from 150° C. to 350° C.

Step c) comprises pressing the heated first sheet from step b) with the film provided in step a) to obtain the laminate. This joins the film to the first sheet. This may reduce the thickness of the film.

Methods of pressing the heated first sheet from step b) with the film provided in step a) are known per se to those skilled in the art.

The steps b) and c) may be performed simultaneously or consecutively. It is preferable when the steps b) and c) are performed simultaneously. In that case, the first sheet is heated while being pressed with the film provided in step a).

The laminate obtained in step c) is typically cooled. Cooling may be carried out by any processes known to those skilled in the art, for example by blowing compressed air onto the laminate. The laminate is preferably cooled while maintaining the pressing pressure.

In the obtained laminate the heated first sheet is the first layer of the at least one first metal and the film is the at least one further layer of the polymer composition (PC).

If the laminate is to comprise at least one second layer an additional step b1) comprising heating a second sheet of at least one second metal is performed. The above-described elucidations and preferences for the heating of the first sheet in step b) apply correspondingly to the heating of the second sheet in step b1).

Step c) then comprises pressing the heated first sheet with the heated second sheet from step b1) while the film provided in step a) is disposed between the heated first sheet and the heated second sheet.

The process for producing the laminate of the invention then typically comprises the steps of:
a) providing a film of a polymer composition (PC) comprising the following components:
(A) at least one polyamide,
(B) at least one copolymer prepared by polymerizing at least the following components:
(B1) at least one $C_2$-$C_{20}$-alkene and
(B2) at least one $C_2$-$C_{18}$-alkenyl ester,
b) heating a first sheet of at least one first metal,
b1) heating a second sheet of at least one second metal,
c) positioning the film provided in step a) between the first sheet heated in step b) and the second sheet heated in step b1) and pressing the first sheet heated in step b) and the second sheet heated in step b1) with the film provided in step a) to obtain the laminate.

The present invention accordingly also provides a process for producing a laminate of the invention which additionally comprises at least one second layer of at least one second metal and where the at least one first layer is joined to the at least one second layer via the at least one further layer, comprising the steps of:
a) providing a film of a polymer composition (PC) comprising the following components:
(A) at least one polyamide,
(B) at least one copolymer prepared by polymerizing at least the following components:
(B1) at least one $C_2$-$C_{20}$-alkene and
(B2) at least one $C_2$-$C_{18}$-alkenyl ester,
b) heating a first sheet of at least one first metal,
b1) heating a second sheet of at least one second metal,
c) positioning the film provided in step a) between the first sheet heated in step b) and the second sheet heated in step b1) and pressing the first sheet heated in step b) and the second sheet heated in step b1) with the film provided in step a) to obtain the laminate.

The above-described elucidations and preferences for the at least one second metal of the at least one second layer of the laminate apply correspondingly to the at least one second metal of the second sheet in the process of the invention.

The above-described elucidations and preferences for the first sheet and the heating of the first sheet apply correspondingly to the second sheet and to the heating of the second sheet.

The above-described elucidations and preferences for step c) likewise apply correspondingly to step c) in which the second sheet is additionally positioned.

The present invention is more particularly elucidated hereinbelow with reference to examples without being limited thereto.

EXAMPLES

The following components were used:
Polyamide
P1: nylon-6 (Ultramid B27E from BASF SE)
P2: nylon-6/6,36 with 30% by weight of nylon-6,36 units
Copolymer
C1: LUWAX EAS 5 (ethylene-vinyl acetate-vinyl alcohol copolymer from BASF SE, 25% to 29% by weight of vinyl acetate, MVR (melt volume flow rate) (160° C./325 g) 8-12 g/10 min)
C2: ESCORENE ULTRA FL 00309 (ethylene-vinyl acetate-vinyl alcohol copolymer from Exxon Mobil, 9.4% by weight of vinyl acetate, MVR (melt volume flow rate) (190° C./2.16 kg) 3 g/10 min to ASTM D 1238)
C3: ESCORENE ULTRA FL 00328 (ethylene-vinyl acetate-vinyl alcohol copolymer from Exxon Mobil, 27% by weight of vinyl acetate, MVR (melt volume flow rate) (190° C./2.16 kg) 3 g/10 min to ASTM D 1238)
C4: FLEXAREN 14003 (ethylene-vinyl acetate-vinyl alcohol copolymer from Leuna, 14% by weight of vinyl acetate, MVR (melt volume flow rate) (190° C./2.16 kg) 3 g/10 min to ISO 1133)
Rubber
K1: Lupolen KR1270 (ethylene-acrylate-maleic anhydride copolymer from BASF SE)
First and Second Metal
  Steel: HX260LADZ100MBO sheet
Preparation of Nylon-6/6,36
Nylon-6/6,36 was prepared by first blanketing caprolactam, $C_{36}$ dimer acid (hydrogenated, Pripol 1009 from Croda), 85% by weight solution of hexamethylenediamine in water, and water with nitrogen and stirred under elevated pressure at a temperature of 270° C. for seven hours, then water was distilled off under reduced pressure for a further four hours. The polyamide obtained was discharged, extruded and pelletized and subsequently extracted with hot water and finally dried. The starting compounds were used in amounts such that the polyamide obtained comprised 30% by weight of nylon-6/6,36 units.

Production of the Polymer Composition

The polymers specified in table 1, in the amounts specified in table 1, were compounded in a Haake CTW100 extruder at 250° C. and extruded at a throughput of 2 kg/h through a round die having a diameter of 3 mm to obtain the polymer composition in pelletized form. The amounts reported in table 1 are all in % by weight.

TABLE 1

| Polymer composition | P1 [% by wt.] | P2 [% by wt.] | C1 [% by wt.] | C2 [% by wt.] | C3 [% by wt.] | C4 [% by wt.] | K1 [% by wt.] |
|---|---|---|---|---|---|---|---|
| PC1 | 100 | | | | | | |
| PC2 | 90 | | | | | | 10 |
| PC3 | 88 | | | | | 2 | 10 |
| PC4 | 88 | | 6 | | | | 6 |
| PC5 | | 100 | | | | | |
| PC6 | | 88 | 12 | | | | |
| PC7 | | 90 | | 10 | | | |
| PC8 | | 90 | | | 10 | | |
| PC9 | 88 | | | | | 6 | 6 |

Production of the Films of the Polymer Composition

The films of the polymer composition were produced by extruding the pelletized polymer composition as described above at 215 to 235° C. in a Haake CTW100 extruder at a throughput of 0.5 to 1.0 kg/h through a slot die having a width of 100 mm to obtain films of the polymer composition having a thickness of 200 μm.

Production of Laminates

Prior to the production, both the films of the polymer composition and the first sheet and second sheet of the steel were stored at 80° C. for 7 days. Both the films and the steel were cleaned with n-heptane in the region of the adherend surfaces before the production of laminates.

The laminate was produced by inserting a first sheet of the steel and a second sheet of the steel into an apparatus. A film of the polymer composition was placed between the first sheet and the second sheet. The sheets are pressed together with a clamping force of 6 kg to achieve a thickness of the film of 0.1 mm after heating.

Inductive heating during the pressing heated the first and the second sheet to a temperature of 240° C. within 3 s, and they were kept at that temperature for a further 7 s to obtain the laminate. The laminate was subsequently cooled with compressed air for 20 seconds and the pressing force was then released during further cooling to room temperature.

The laminates obtained were subjected to the following tensile shear test according to DIN 1465 directly after production and after storage for 14 days at 70° C. and 62% relative air humidity; five samples were tested in each case:

i) Storage of the samples for 1 hour at room temperature (25° C.).

ii) Clamping in an Instron 10KN/Instron 150KN tester with specimen guard and application of tensile force until breakage at a rate of 10 mm/min. The maximum force is used to determine the tensile shear force in respect of the adherend surface by methods known to those skilled in the art iii) The adherend parts are removed from the holder and the fracture pattern is documented. The results are shown in table 2.

TABLE 2

| Example | Polymer composition | Tensile strength before storage [MPa] | Tensile strength after storage [MPa] |
|---|---|---|---|
| V1 | PC1 | 6 | 0 |
| V2 | PC2 | 7 | 0 |
| B3 | PC3 | 11 | 5 |
| B4 | PC4 | 17 | 17 |
| V5 | PC5 | 8 | 6 |
| B6 | PC6 | 11 | 6 |
| B7 | PC7 | 21 | 15 |
| B8 | PC8 | 22 | 14 |
| B9 | PC9 | 14 | 10 |

The invention claimed is:

1. A laminate comprising at least one first layer of at least one first metal and at least one further layer of a polymer composition (PC), wherein the polymer composition (PC) comprises the following components:
   (A) at least one polyamide, and
   (B) at least one copolymer obtainable by polymerizing at least the following components:
      (B1) at least one $C_2$-$C_{20}$-alkene and
      (B2) at least one $C_2$-$C_{18}$-alkenyl ester,
   wherein component (A) is obtainable by polymerizing caprolactam and optionally at least one of the components selected from the group consisting of:
      (A2) at least one $C_4$-$C_{40}$ diacid, and
      (A3) at least one $C_4$-$C_{20}$ diamine
   wherein the caprolactam is present in an amount of at least 35 wt % relative to component (A); and
   wherein component (B) is not a graft polymer, wherein the polymer composition (PC) comprises in the range from 2% to 30% by weight of component (B), based on the sum total of the percentages by weight of components (A) and (B).

2. The laminate according to claim 1, wherein the laminate further comprises at least one second layer of at least one second metal and wherein the at least one first layer is joined to the at least one second layer via the at least one further layer.

3. The laminate according to claim 1, wherein component (B1) is selected from the group consisting of ethene, propene, 1-butene and 2-butene.

4. The laminate according to claim 1, wherein component (B2) is selected from the group consisting of vinyl acetate, vinyl propionate and vinyl butyrate.

5. The laminate according to claim 1, wherein component (B) is selected from the group consisting of polyethylene-vinyl acetate, polyethylene-vinyl alcohol and ethylene-vinyl acetate-vinyl alcohol copolymers.

6. The laminate according to claim 1, wherein the polymer composition (PC) additionally comprises in the range from 1% to 30% by weight of a component (C), at least one rubber, based on the sum total of the percentages by weight of components (A), (B) and (C).

7. The laminate according to claim 1, wherein the polymer composition (PC) further comprises at least one filler selected from the group consisting of inorganic fillers, organic fillers and natural fillers.

8. The laminate according to claim 1, wherein the at least one first metal is selected from the group consisting of iron, aluminum, copper, nickel and magnesium and also alloys thereof.

9. The laminate according to claim 1, wherein the at least one first layer has a thickness in the range from 0.1 mm to 0.6 mm and/or wherein the at least one further layer has a thickness in the range from 0.02 mm to 1.5 mm.

10. A process for producing a laminate according to claim 1, comprising the steps of
   a) providing a film of a polymer composition (PC) comprising the following components:
      (A) at least one polyamide, and
      (B) at least one copolymer prepared by polymerizing at least the following components:
         (B1) at least one $C_2$-$C_{20}$-alkene and
         (B2) at least one $C_1$-$C_{18}$-alkenyl ester,
   b) heating a first sheet of at least one first metal,
   c) pressing the heated first sheet from step b) with the film provided in step a) to obtain the laminate.

11. The process according to claim 10, wherein step b) comprises heating the first sheet to a temperature in the range from 150° C. to 350° C.

12. The process according to claim 10, wherein the heating of the first sheet in step b) is effected by inductive means.

13. The process according to claim 10, wherein step a) comprises providing the film by an extrusion process.

* * * * *